(12) United States Patent
Lucas

(10) Patent No.: US 11,156,234 B2
(45) Date of Patent: Oct. 26, 2021

(54) EJECTOR FOR A FUEL CELL SYSTEM AND FUEL CELL SYSTEM

(71) Applicants: AUDI AG, Ingolstadt (DE); Volkswagen AG, Wolfsburg (DE)

(72) Inventor: Christian Lucas, Braunschweig (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 244 days.

(21) Appl. No.: 16/550,070

(22) Filed: Aug. 23, 2019

(65) Prior Publication Data

US 2020/0067112 A1 Feb. 27, 2020

(30) Foreign Application Priority Data

Aug. 24, 2018 (DE) ...................... 10 2018 214 376.5

(51) Int. Cl.
| | |
|---|---|
| *F04F 5/16* | (2006.01) |
| *F04F 5/46* | (2006.01) |
| *H01M 8/04089* | (2016.01) |
| *F04F 5/20* | (2006.01) |
| *F04F 5/50* | (2006.01) |
| *F04F 5/48* | (2006.01) |
| *H01M 8/04082* | (2016.01) |

(52) U.S. Cl.
CPC .................. *F04F 5/16* (2013.01); *F04F 5/20* (2013.01); *F04F 5/461* (2013.01); *F04F 5/48* (2013.01); *F04F 5/50* (2013.01); *H01M 8/04097* (2013.01); *H01M 8/04201* (2013.01)

(58) Field of Classification Search
CPC ........ F04F 5/16; F04F 5/20; F04F 5/48; F04F 5/50; F04F 5/52; F04F 5/461; H01M 8/04097; H01M 8/04201; Y02E 60/50
See application file for complete search history.

(56) References Cited

U.S. PATENT DOCUMENTS

| | | | |
|---|---|---|---|
| 267,022 A  * | 11/1882 | Schutte | |
| 4,595,344 A | 6/1986 | Briley | |
| 6,858,340 B2 | 2/2005 | Sugawara et al. | |
| 8,083,495 B2 * | 12/2011 | Whaling | F04F 5/20 417/189 |
| 9,696,069 B2 | 7/2017 | Liu et al. | |

(Continued)

FOREIGN PATENT DOCUMENTS

| | | |
|---|---|---|
| DE | 100 36 045 C1 | 10/2001 |
| DE | 10 2015 216 457 A1 | 3/2017 |

(Continued)

*Primary Examiner* — Charles G Freay
(74) *Attorney, Agent, or Firm* — Seed Intellectual Property Law Group LLP

(57) ABSTRACT

An ejector with a suction nozzle is disclosed, with a drive nozzle and with a mixing tube, to which is assigned an adjustment device for the at least region-wise adjustment of a flow cross-section of the mixing tube. Inside the drive nozzle, an axially movable needle which is designed to adjust a flow cross-section of the drive nozzle is arranged and a coupling mechanism is provided which connects the adjustment device to the needle or to an actuator actuating the needle in such a way that the adjustment device adjusts or changes the flow cross-section of the mixing tube as a function of an axial needle movement. A fuel cell system with such an ejector is also disclosed.

10 Claims, 16 Drawing Sheets

(56) References Cited

U.S. PATENT DOCUMENTS

| | | | | |
|---|---|---|---|---|
| 2002/0106547 A1* | 8/2002 | Sugawara | ............... | F04F 5/461 |
| | | | | 429/443 |
| 2014/0212776 A1* | 7/2014 | Osborne | ........... | H01M 8/04619 |
| | | | | 429/415 |
| 2019/0032679 A1* | 1/2019 | Kawashima | .............. | F04F 5/18 |

FOREIGN PATENT DOCUMENTS

| | | |
|---|---|---|
| EP | 2 204 562 A2 | 7/2010 |
| WO | 2017018162 A1 | 2/2017 |

* cited by examiner

EJECTOR FOR A FUEL CELL SYSTEM AND FUEL CELL SYSTEM

BACKGROUND

Technical Field

Embodiments of the invention relate to an ejector, in particular for an anode circuit of a fuel cell system, comprising a suction nozzle, a drive nozzle and a mixing tube. An adjustment device is assigned to the mixing tube for the at least region-wise adjustment of a flow cross-section of the mixing tube. Embodiments of the invention also relate to a fuel cell system having a fuel cell stack which is integrated into an anode circuit into which an ejector is fluidically coupled.

Description of the Related Art

Fuel cells use the chemical conversion of a fuel with oxygen into water in order to generate electrical energy. For this purpose, fuel cells contain as a core component what is known as the membrane electrode assembly (MEA), which is a combination of a proton-conducting membrane and in each case one electrode (anode and cathode) arranged on each of the two sides of the membrane. In addition, gas diffusion layers (GDL) can be arranged on both sides of the membrane electrode assembly on the sides of the electrodes facing away from the membrane. The fuel cell is formed as a rule by a plurality of MEAs arranged in the stack, the electrical power outputs of which add up. During operation of the fuel cell, the fuel, in particular hydrogen $H_2$ or a gas mixture containing hydrogen, is fed to the anode where an electrochemical oxidation of $H_2$ to $H^+$ with loss of electrons takes place. A (water-bound or water-free) transportation of the $H^+$ protons from the anode chamber into the cathode chamber is effected via the electrolyte or the membrane, which separates the reaction chambers from each other in a gas-tight and electrically insulates them. The electrons provided at the anode are guided to the cathode via an electrical line. The cathode receives oxygen or a gas mixture containing oxygen so that a reduction of $O_2$ to $O^{2-}$ with a gain of electrons takes place. At the same time, those oxygen anions react in the cathode chamber with the protons transported via the membrane while forming water. As a result of the direct conversion of chemical into electrical energy, fuel cells have improved efficiency compared to other electricity generators because the Carnot factor is avoided.

Since the anode reaction is usually operated with superstoichiometric metering of the fuel, there is no complete reaction of all of the supplied fuel in the fuel cell stack. A complete reaction of the oxygen also does not take place. For efficient use of the fuel, the fuel is therefore frequently routed (recirculated) into an anode circuit/anode loop, wherein, before the fuel is fed back to the fuel cell stack, the fuel is enriched again to such an extent that a superstoichiometric metering of the fuel is again implemented and the reaction can take place.

In the anode circuit, an ejector (jet pump) which recirculates the anode gas by means of the potential energy of the hydrogen from a fuel tank can be used. The efficiency of an ejector depends heavily on its geometry and in particular on the size of the drive nozzle and the size of the mixing tube. The optimum ejector geometry depends on the particular operating conditions of the fuel cell that change during the operation of a vehicle. For example, an ideal geometry for the mixing tube and the drive nozzle for high load points differs from that at low load points. However, ejectors or jet pumps usually have a fixed geometry so that adjustments to the operating state of a fuel cell are not possible.

One approach to implementing an adaption of an ejector during operation is disclosed in US 2014/0212776 A1, EP 2 204 562 A2, WO 2017/018 162 A1 and DE 10 2015 216 457 A1, in which an ejector with a variable geometry of the mixing tube is described. For this purpose, a flexible insert which can be filled with gas or otherwise adjusted so that the diameter of the mixing tube is thereby reduced is, for example, arranged in the mixing tube. In a further embodiment of an ejector that is described in US 2014/0212776 A1, the flexible insert is surrounded by rings, the diameter of which can be adjusted by means of a motor each so that the geometry of the mixing tube can be changed. In addition, according to EP 2 204 562 A2, the diameter of the drive nozzle can be varied. One possibility for varying the diameter of the drive nozzle is also described in U.S. Pat. Nos. 9,696,069 B2 and 6,858,340 B2.

BRIEF SUMMARY

The present disclosure describes an ejector that can be adapted to different operating states of a fuel cell system as well as to a fuel cell system having this ejector.

The ejector is characterized in particular in that an axially movable needle, i.e., a needle movable along the longitudinal axis of the needle, is arranged inside the drive nozzle and is designed to adjust a flow cross-section of the drive nozzle, and that a coupling mechanism is provided which connects the adjustment device to the needle or to an actuator actuating the needle in such a way that the adjustment device adjusts or changes the flow cross-section of the mixing tube as a function of an axial movement of the needle.

This has the advantage that reducing the flow cross-section of the drive nozzle due to the axial movement of the needle simultaneously results in a reduction in the flow cross-section of the mixing tube. Conversely, an enlargement of the flow cross-section of the drive nozzle is observed when the flow cross-section of the mixing tube increases. At low loads, the mixing tube can thus be reduced in its flow cross-section, whereby lower fuel mass flows are also present. Here, larger mass flows are required at high loads, as a result of which larger flow cross-sections are also required. With the proposed embodiment of the ejector, its recirculation capability can be increased, wherein the recirculation of the anode gas can be ensured solely by the ejector and without the use of further components. In this way, for example, a recirculation blower can be dispensed with in the anode circuit, or such a recirculation blower can be designed to be smaller in terms of size and power.

It has been found to be advantageous for an inner wall of the mixing tube to consist entirely or partially of an elastic membrane which can be moved between a first position forming a reduced flow cross-section of the mixing tube and a second position forming an enlarged flow cross-section of the mixing tube. The surface area of the reduced flow cross-section is thus smaller or significantly smaller than the surface area of the enlarged flow cross-section of the mixing tube. The membrane is thus part of the adjustment device with which the flow cross-section of the mixing tube can be varied.

It has proven to be advantageous for the movement of the membrane between the first position and the second position if the membrane is subjected to a restoring force in the first position or if the restoring force acts when the membrane is moved from the second position into the first position.

In order to also be able to achieve as straight a geometry as possible of the mixing tube, in particular a diameter as constant as possible in the interior of the mixing tube, it has proven to be advantageous if at least one, in particular a dimensionally stable, stiffening element is assigned to the membrane. Alternatively, however, the at least one stiffening element can also be embedded in the elastomer membrane. In this connection, it has proven to be expedient for a plurality of stiffening elements to be present, the plurality of stiffening elements being arranged, in particular uniformly distributed, over the circumference of the membrane.

For an operationally reliable movement of the membrane between the first position and the second position, it has proven to be expedient if the adjustment device has an annular or helical or belt-shaped element which at least indirectly abuts on an outer shell of the membrane and by which the membrane can be moved between the first position and the second position, and if the element is connected by means of the coupling mechanism such that the membrane is moved as a function of the axial movement of the needle inside the drive nozzle. The annular or helical or belt-shaped element abuts, for example indirectly, on the membrane when the membrane is provided with one or more stiffening elements in order to produce a constant diameter of the mixing tube. However, it is also possible for the element to be arranged directly on the outer shell of the membrane. For example, an annular or helical element may be a thread, a cord, a wire, a cable or the like which is wound with a plurality of turns around the outer shell so that when the element contracts, a constriction takes place in such a way that the flow cross-section of the mixing tube is reduced. The element can be designed to be elastic or rigid. Furthermore, there is also the possibility of providing the outer shell of the membrane with a friction-reduced coating so that the annular or helical or belt-shaped element can more easily move the membrane between its two positions.

In this connection, it is also possible for the adjustment device to comprise a pressure chamber which is designed to move the membrane between the first and the second positions when a piston assigned to the coupling mechanism is at least partially pushed into or at least partially withdrawn from the pressure chamber. The adjustment device thus makes use of the knowledge that liquids are incompressible so that the piston moves the membrane during fluid-tight entering into or exiting from the pressure chamber, the wall of which at least section-wise consists of the membrane, whereby the flow cross-section of the mixing tube changes. A suitable liquid is, for example, a hydraulic fluid, such as oil or alcohol, in particular a liquid with low thermal expansion.

A particularly compact design of the ejector can be achieved by forming the coupling mechanism from a traction element or an actuating rod, which is connected in particular to a needle body. This ensures that, when the needle is moved in such a manner that the flow cross-section of the drive nozzle is reduced, the flow cross-section of the mixing tube is reduced at the same time. A thread, a wire, a cord, a cable or the like may be used as the traction element.

It has also proven to be advantageous if the coupling mechanism comprises a shaft that is connected in a rotationally fixed manner at one end to the adjustment device and that is designed to be rotationally driven by means of the axial movement of the needle. This allows the shaft to wind up a wire, thread, cord, cable or the like, reducing the flow cross-section of the membrane and thus the flow cross-section through the mixing tube. However, the shaft of the coupling mechanism may also be connected to an adjustment device that comprises a belt surrounding the membrane so that when the shaft is rotated, the belt is wound up and the membrane is thus compressed. When the membrane is compressed, the flow cross-section of the mixing tube is thus also reduced.

If the movement of the needle is not to be applied at a ratio of one to one to the movement of the membrane, it has proven to be advantageous if the coupling mechanism includes a transmission gear designed to transfer the axial movement of the needle at a predetermined gear ratio to the movement of the membrane.

The advantages and advantageous embodiments described for the ejector also apply to the fuel cell system.

The features and combinations of features mentioned above in the description and the features and combinations of features mentioned below in the description of the figures and/or shown in the figures alone can be used not only in the respective combination but also in other combinations or individually. Thus, designs that are not explicitly shown or explained in the figures but result from and can be produced through separate combinations of features from the embodiments described are thus also to be regarded as covered and disclosed.

BRIEF DESCRIPTION OF THE SEVERAL VIEWS OF THE DRAWINGS

Additional advantages, features and details arise from the claims, the following description of embodiments of the invention and on the basis of the drawings. The following is shown:

DETAILED DESCRIPTION

Figure 1:
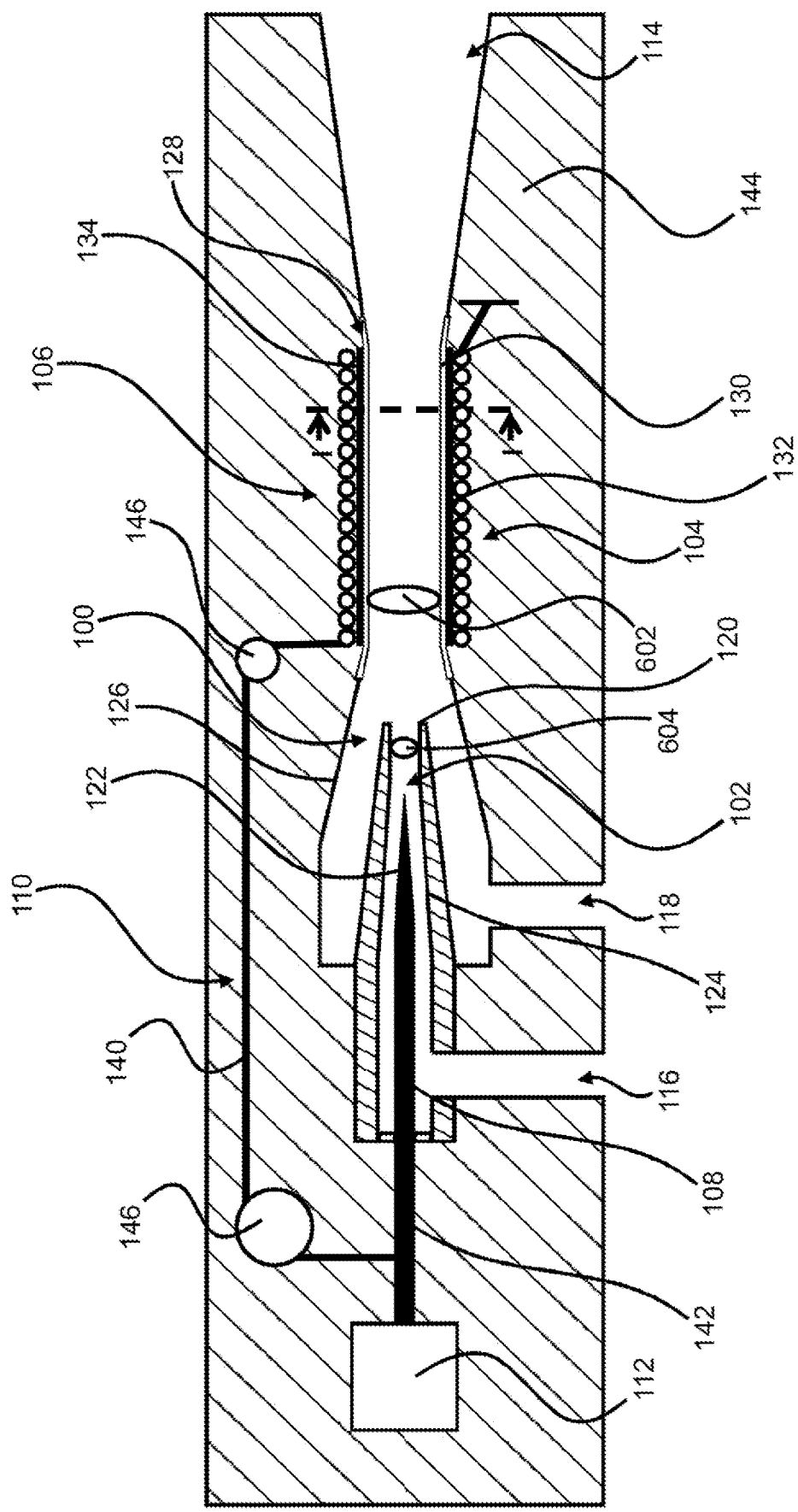
FIG. 1 a sectional view of a schematically represented ejector.

Various ejectors are described in the figures, wherein the same components are provided with the same reference signs. All ejectors have a suction nozzle 100, a drive nozzle 102 and a mixing tube 104. The ejectors shown also have a diffuser 114 connected to the mixing tube 106. The drive nozzle 102 can be fluidically connected via a port 116 to a fuel storage (not shown in detail) so that through the port 116, fresh fuel can be fed into the mixing tube 104 via the drive nozzle 102. The suction nozzle 100, on the other hand, has a port 118, through which the recirculated fuel that was not consumed in a fuel cell stack (not shown in detail) is introduced or sucked in.

A needle 108 having a needle tip 122 tapering conically in the direction of the nozzle opening 120 of the drive nozzle 102 is arranged inside the drive nozzle 102, in particular concentrically thereto. Moreover, the drive nozzle 102 itself is designed with a nozzle section 124 tapering in the direction of the nozzle opening 120. A flow cross-section 604 of the drive nozzle 102 can be varied by means of the needle 108. For this purpose, the needle 108 is axially movable so that upon a movement of the needle 108 in the direction of the nozzle opening 120, the flow cross-section 604 of the drive nozzle 102 is reduced. When the needle 108 is moved axially in a direction turned away from the nozzle opening 120, the flow cross-section 604 is increased and a larger proportion of fresh fuel can enter the mixing tube 104. For the movement of the needle 108, an actuator 112 is provided, which is formed, for example, as a linear drive. Moreover, the suction nozzle 100 is formed with a nozzle section 126 tapering in the direction of the mixing tube 104.

A flow cross-section 602 of the mixing tube 104 can be varied by means of an adjustment device 106. This adjustment device 106 for adjusting a flow cross-section 602 of the mixing tube 104 is at least region-wise connected by means of a coupling mechanism 110 to the needle 108 or to the actuator 112 actuating the needle 108 in such a manner that the adjustment device 106 adjusts or changes the flow cross-section 602 of the mixing tube 104 as a function of an axial needle movement.

If the fuel cell system is to be operated at a low load, the flow cross-sections 602, 604 are kept as small as possible. In this case, the needle 108 is moved in the direction of the nozzle opening 120, which reduces the flow cross-section 604 of the drive nozzle 102. Due to the coupling mechanism 110, the adjustment device 106 then also reduces the flow cross-section 602 of the mixing tube 104. In the opposite case, for example if the fuel cell system is to be operated with a large load, the needle 108 is retracted by means of the actuator 112 and the flow cross-section 604 of the drive nozzle 102 is again increased. More fresh fuel then flows through the drive nozzle 102, whereby the recirculated fuel is also "taken along" more strongly via the suction nozzle 100. At the same time, the flow cross-section 602 of the mixing tube 104 again expands.

An inner wall 128 of the mixing tube 104 is formed entirely from an elastic membrane 130, which is movable between a first position forming a reduced flow cross-section 602 of the mixing tube 104 and a second position forming an enlarged flow cross-section 602 of the mixing tube 104. The membrane 130 is subject to a pre-loading so that a restoring force acts if the membrane 130 is located in the first position or if the membrane 130 is moved from the second position to the first position. This means that the membrane 130 has an impulse to maximize the flow cross-section 602. In order to adjust the flow cross-section 602, the adjustment device 106 has an annular or helical or ribbon-shaped element which at least indirectly abuts on an outer shell 134 of the membrane 130 and by means of which the membrane 130 can be moved between the first position and the second position, wherein the element is connected by means of the coupling mechanism 110 in such a manner that the movement of the membrane 130 takes place as a function of the axial movement of the needle 108 within the drive nozzle 102. Alternatively, the adjustment device 106 may comprise a pressure chamber 136 that is designed to move the membrane 130 between the first and second positions if a piston 138 assigned to the coupling mechanism 110 is at least partially pushed into or withdrawn from the pressure chamber 136 (FIG. 11 (see below)).

In the ejector shown in FIG. 1, a thread 140, which is fixed at one end to the needle 108 or to the needle body 142 and at the other end to the ejector body 144, is wound around the membrane 130 in a ring shape, in particular in a helical shape. The thread 140 can also be a string, a wire, a cable or the like. It is preferably subjected to mechanical stress, wherein it is also preferably elastic. For movement, the ejector shown in FIG. 1 has several rotating but stationary deflection rollers 146 mounted opposite the ejector body 144, around which deflection rollers the thread 140 is guided. If the needle 108 is moved in the direction of the nozzle opening 120 of the drive nozzle 102, the thread 140 is tensioned and thus constricts the membrane 130 so that the flow cross-section 602 of the mixing tube 104 is reduced. If the needle 108 is retracted again, the flow cross-section 602 is increased again due to the elasticity of the membrane 130. In order to ensure that the membrane 130 is kept as straight as possible in the area of the mixing tube 104, thus with a constant diameter, at least one stiffening element 132 is arranged on the outer shell 134 of the membrane 130, which stiffening element is formed in particular as a fixed, dimensionally stable strut.

Figure 2:
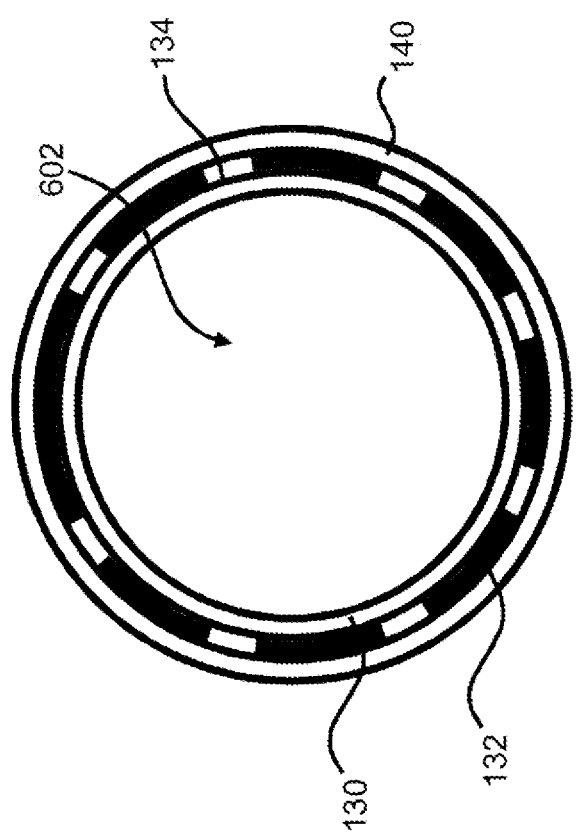
FIG. 2 section I-I from FIG. 1.

In the sectional view according to FIG. 2, it can be seen that there are several stiffening elements 132 distributed over the circumference of the membrane 130, which stiffening elements are arranged in particular in a manner evenly distributed over the outer shell 134 of the membrane 130. The thread 140 is thus applied only indirectly to the outer shell 134, as it interacts with the membrane 130 through or via the stiffening elements 132.

Figure 3:
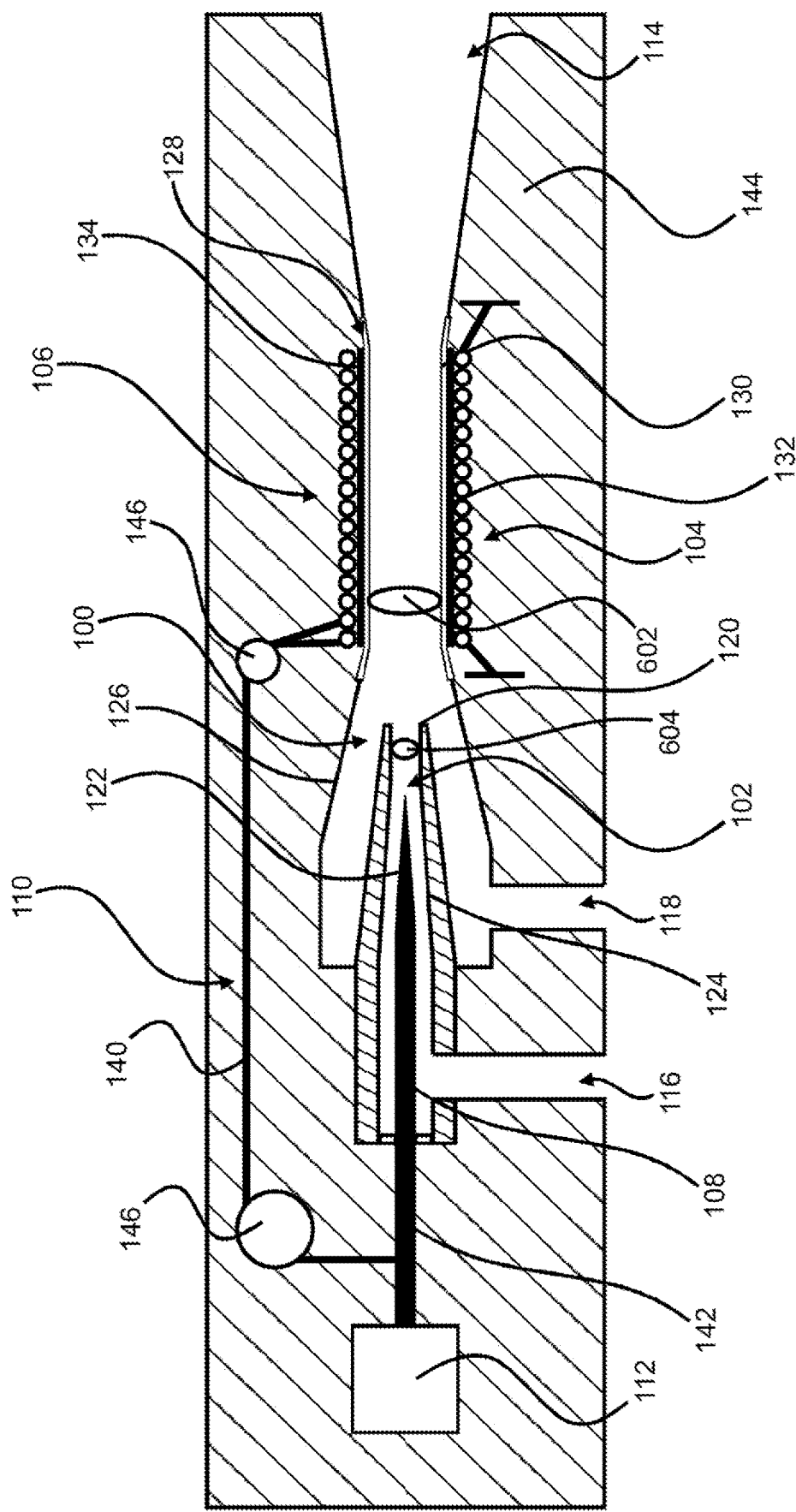
FIG. 3 a sectional view of an additional schematically represented ejector.

The ejector according to FIG. 3 differs from the ejector according to FIG. 1 in that several threads, namely two of the threads 140, are provided, which are coupled at one end to the needle 108 and at the other end to the ejector body 144. A different number, for example more than two threads 140, is also possible.

Figure 4:
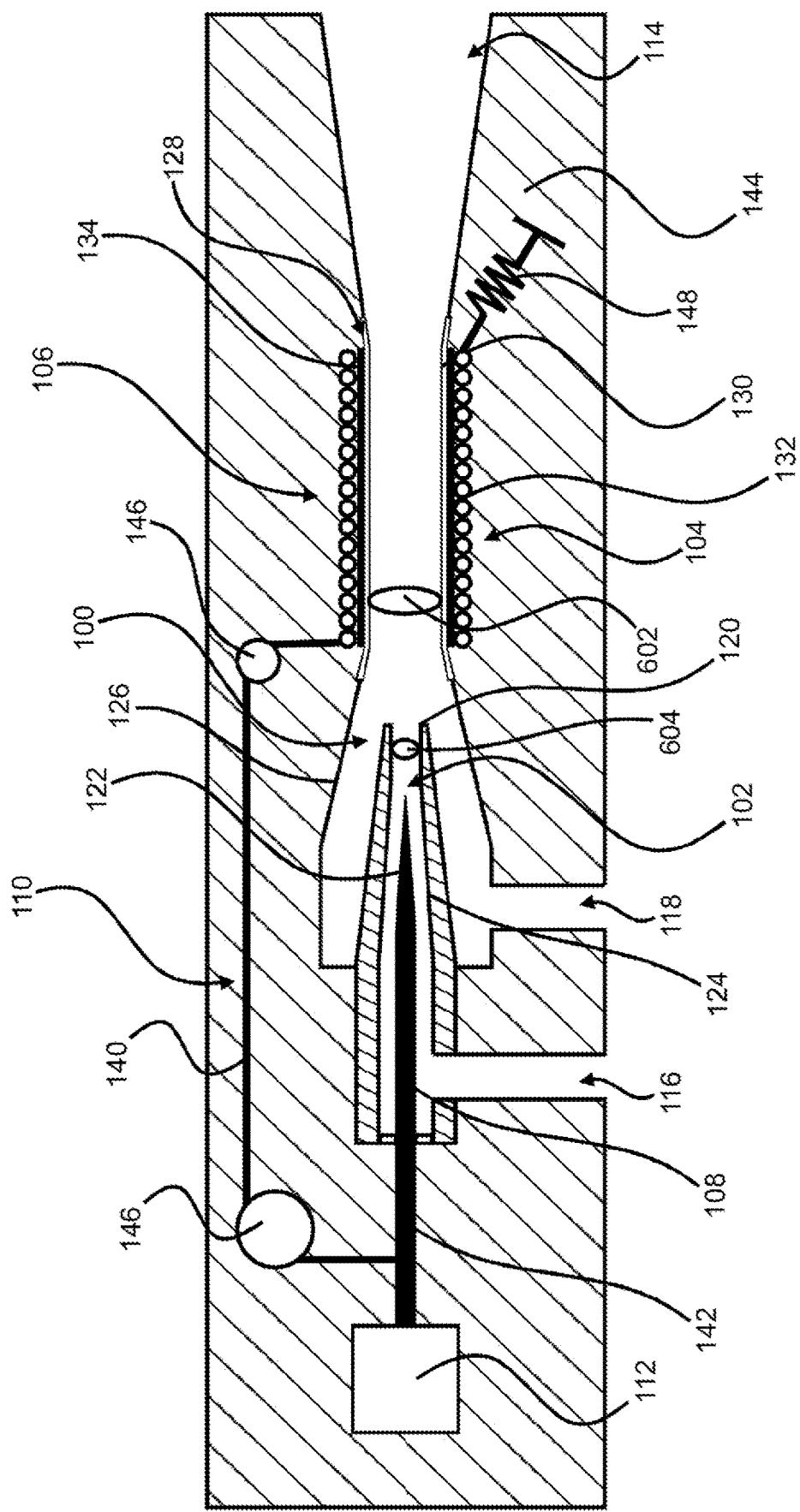
FIG. 4 a sectional view of an additional schematically represented ejector.

FIG. 4 shows a variant of an ejector with which the thread 140, the cord, the wire, the cable or the like is not elastically formed, for which purpose it is mounted in a spring-loaded manner opposite the ejector body 144. For this purpose, a spring element 148 is arranged between the thread end and the fixing on the ejector body 144.

Figure 5:
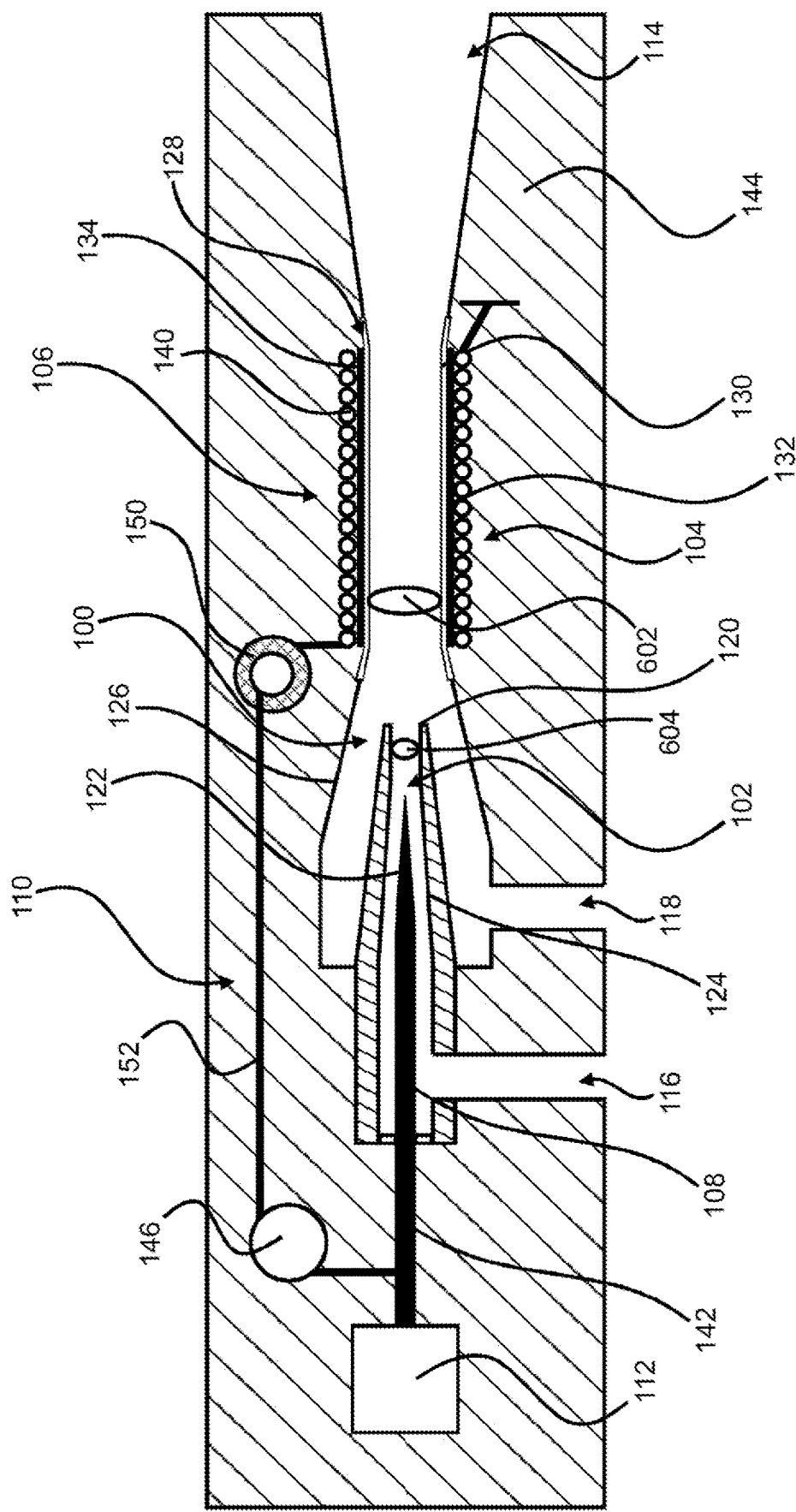
FIG. 5 a sectional view of an additional schematically represented ejector.

For the design of the coupling mechanism 110, it may be necessary to provide a transmission of the needle movement and the movement of the membrane 130. For this reason, it is proposed in FIG. 5 that the coupling mechanism 110 comprises a transmission gear 150, which is designed to transfer the axial movement of the needle 108 at a predetermined gear ratio to the movement of the membrane 130. As in the ejectors described above, a thread 140 is also wound around the membrane 130 in this case, allowing the flow cross-section 602 of the mixing tube 104 to be adjusted. This thread 140 is connected at one end to the ejector body 144 and at the other end to a transmission wheel of the transmission gear 150. The transmission gear 150 comprises a transmission step which is formed with a smaller diameter and to which a second thread 152, cord, wire, cable or the like is fixed. This second thread 152 is then connected at the other end to the needle 108 so that the movement of the needle 108 is transferred to the movement of the membrane 130 with a gear ratio specified by the transmission gear 150.

Figure 6:
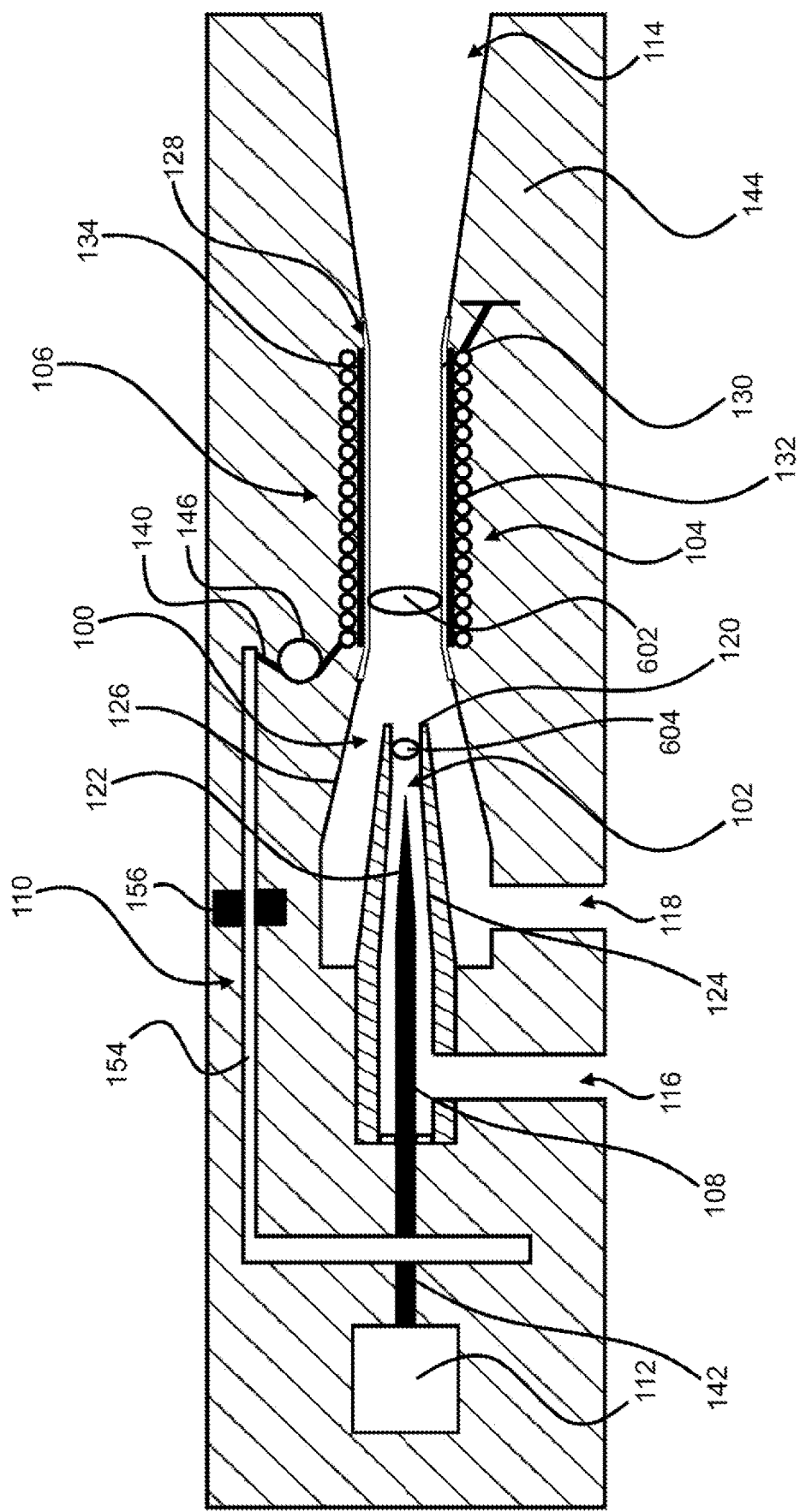
FIG. 6 a sectional view of an additional schematically represented ejector.

The ejector according to FIG. 6 shows the possibility of connecting a rod assembly 154, which is guided by a bearing 156 and to which the thread 140 is fixed, to the needle 108. This also offers the possibility of coupling the movement of the needle 108 and the movement of the membrane 130. The thread 140 by means of which the mixing tube 104 can be varied is attached to the end of the rod. A deflection roller 146, or several of them, can also be used here.

Figure 7:
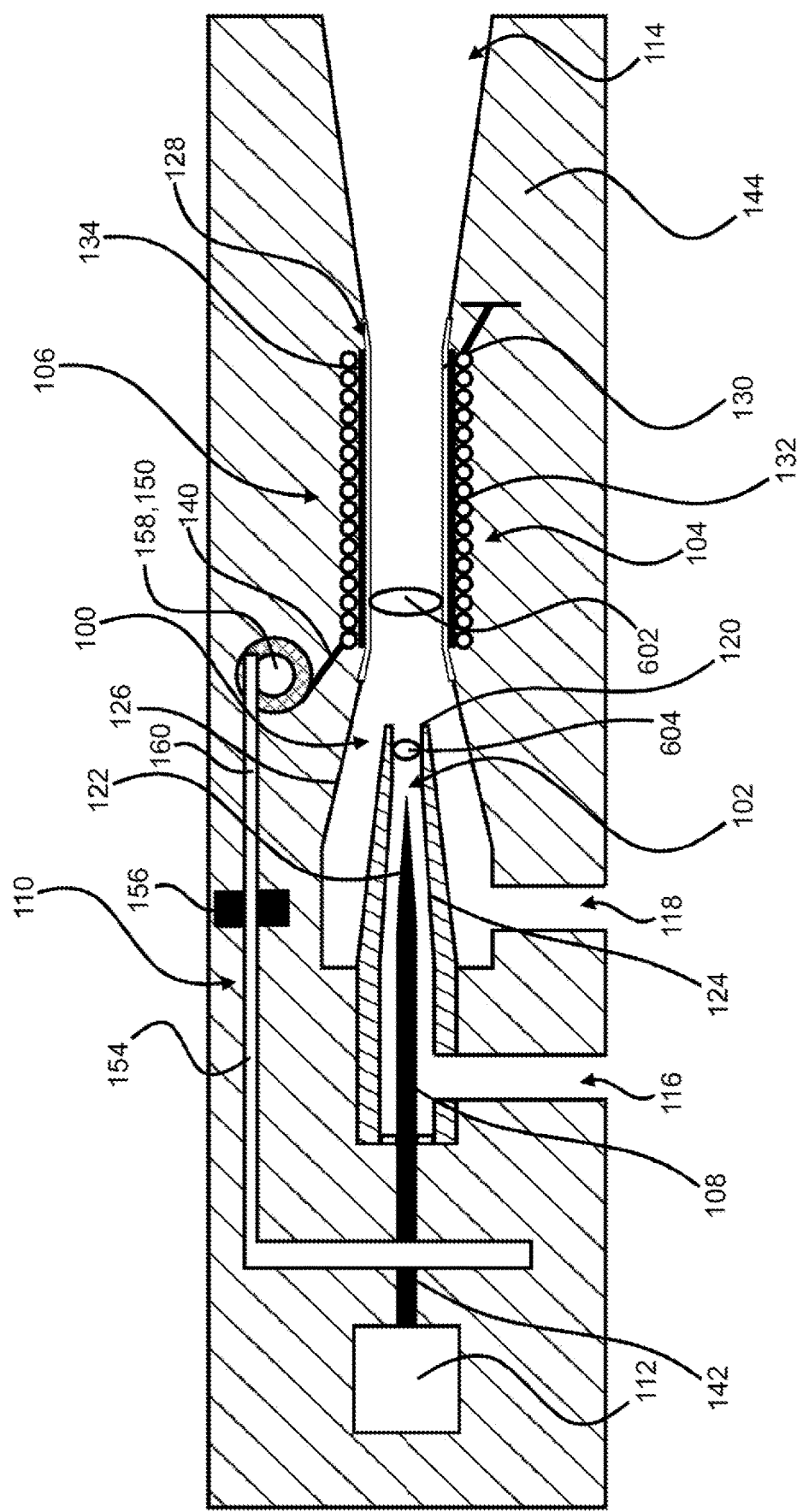
FIG. 7 a sectional view of an additional schematically represented ejector.

FIG. 7 shows a rod assembly 154 that interacts with a transmission gear 150, which in turn is connected to the thread 140 with a transmission step. In this case, the transmission gear 150 can comprise a gear wheel 158 with which a gear rack 160 of the rod assembly 154 meshes.

Figure 8:
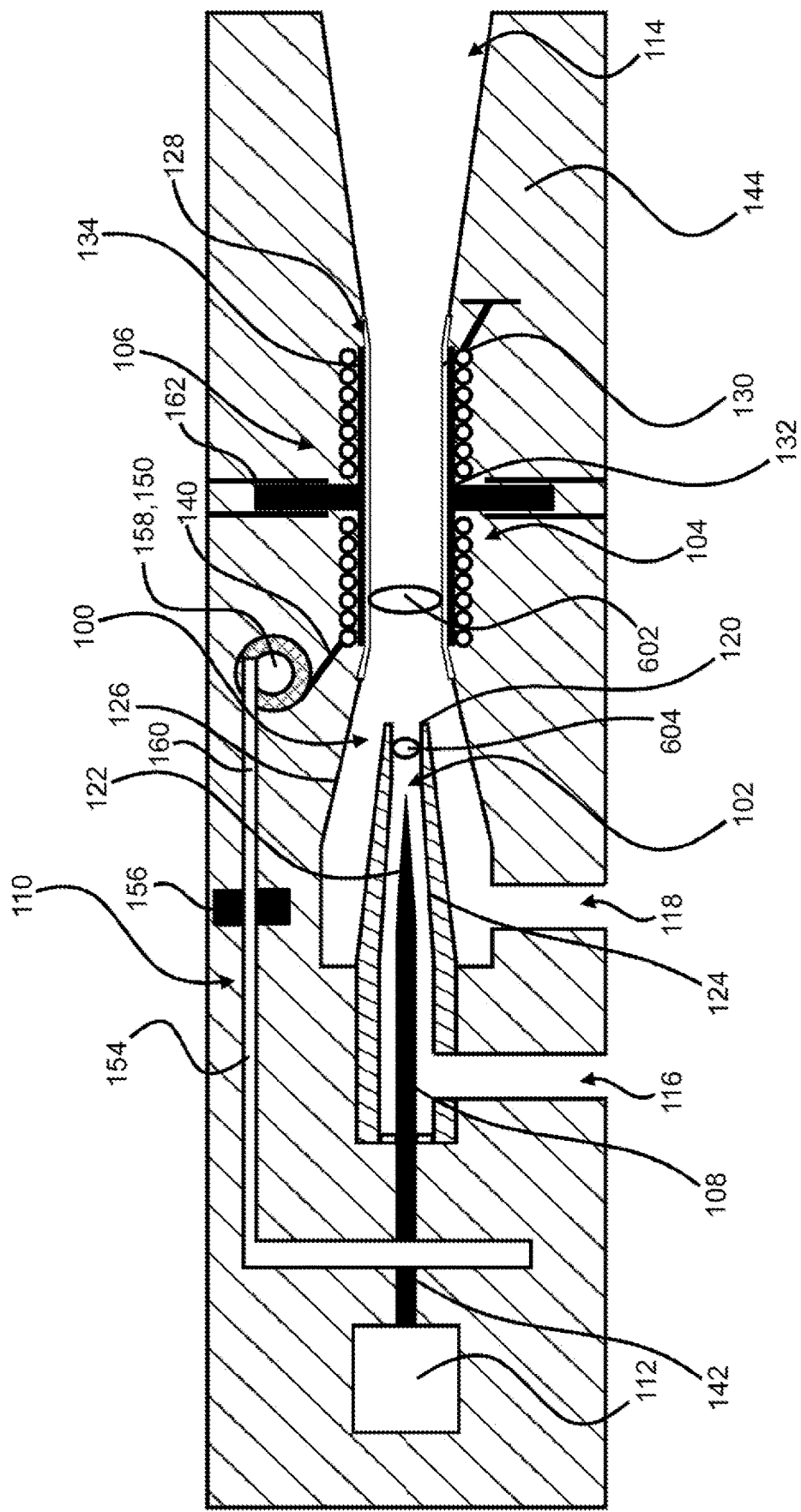
FIG. 8 a sectional view of an additional schematically represented ejector.

In order to keep the deflection of the membrane 130 straight in the area of the mixing tube 104, it may be necessary to provide a guide 162 for the stiffening elements 132, thus for the dimensionally stable struts, on the membrane 130, as can be seen in the ejector according to FIG. 8. The stiffening elements 132 thus have a bar that is guided outwards, in particular radially, in a groove.

Figure 9:
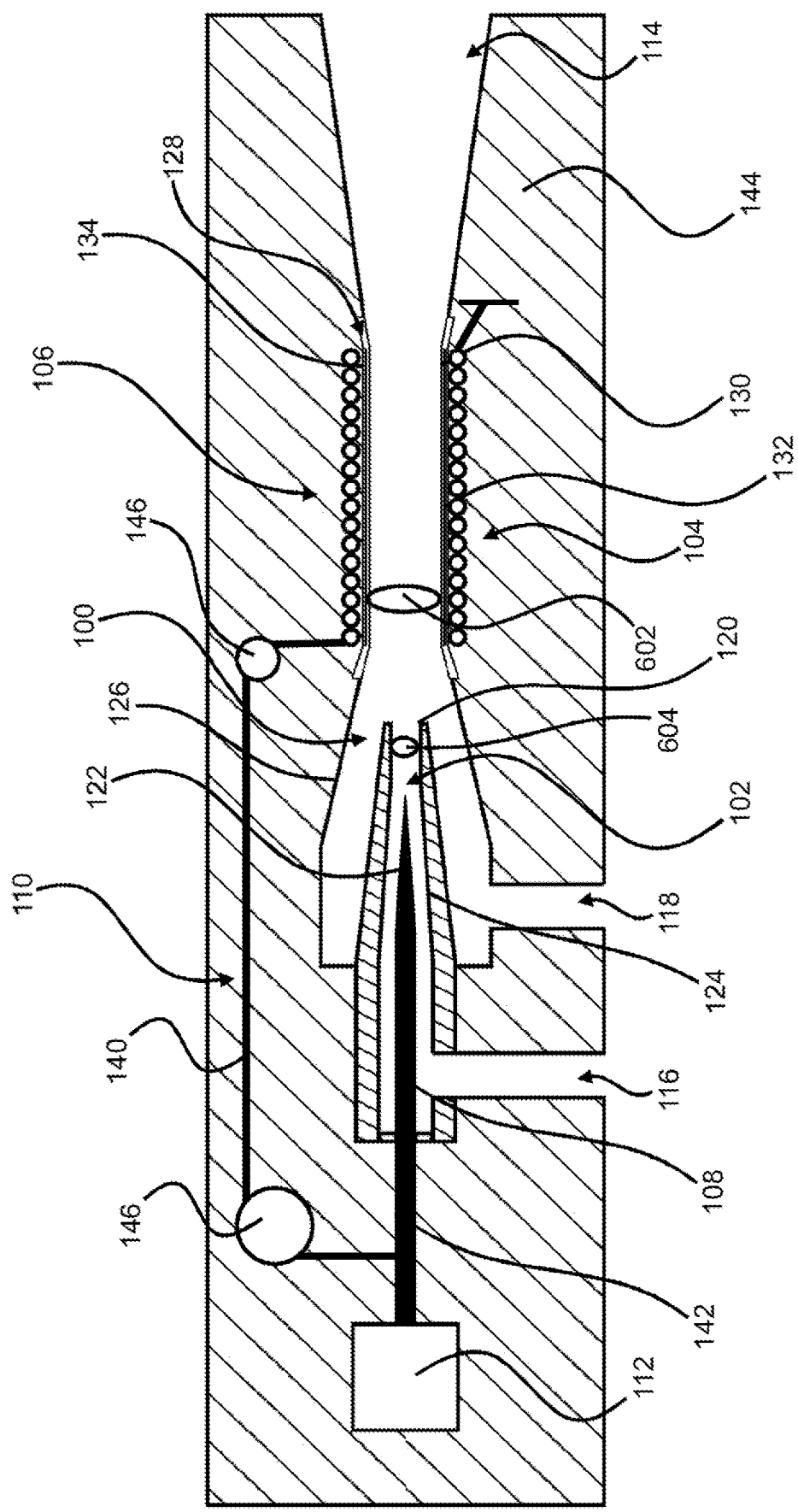
FIG. 9 a sectional view of an additional schematically represented ejector.
Figure 10:
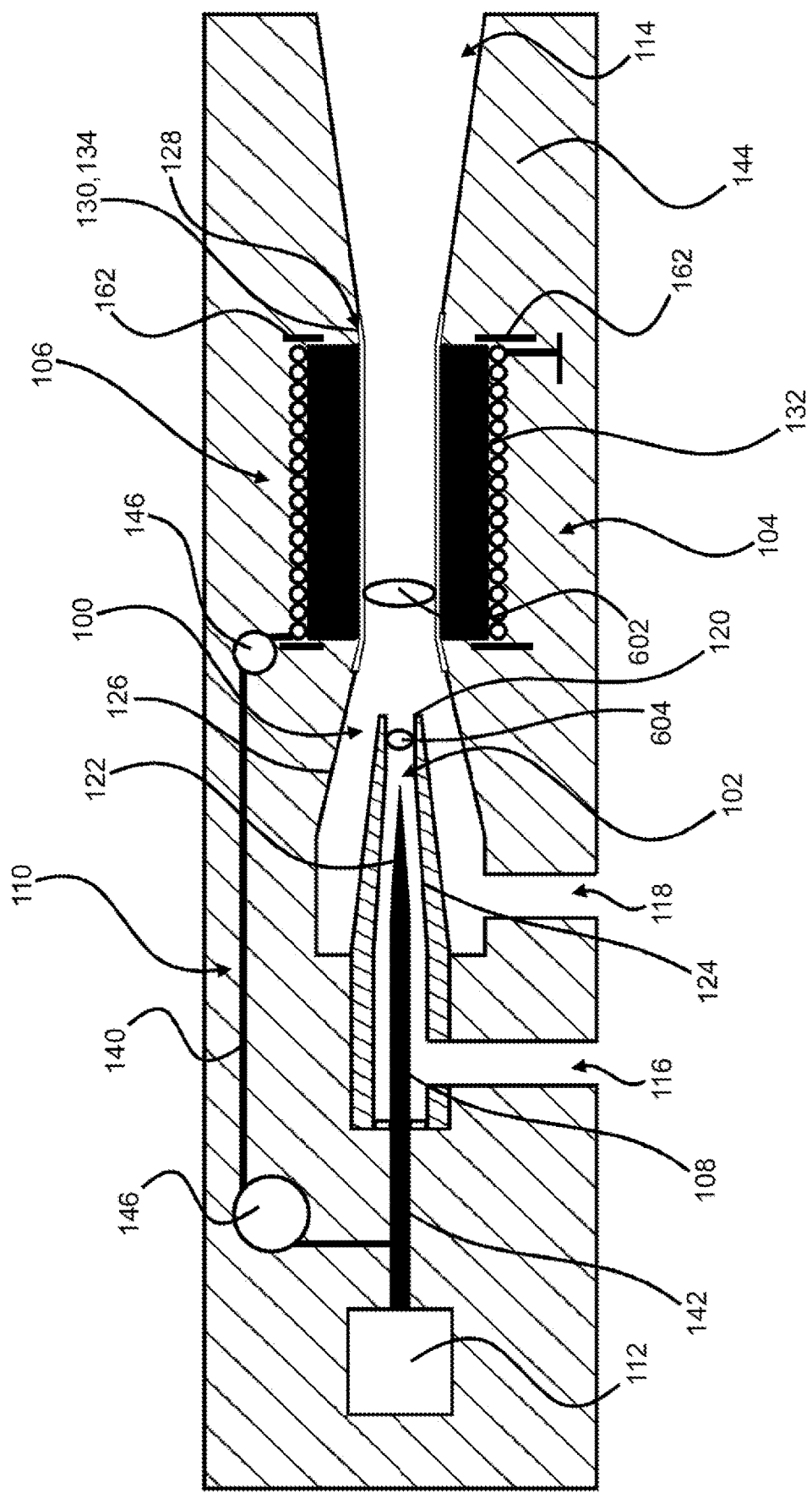
FIG. 10 a sectional view of an additional schematically represented ejector, FIG. 11 a sectional view of an additional schematically represented ejector, FIG. 12 a sectional view of an additional schematically represented ejector, FIG. 13 a sectional view of an additional schematically represented ejector, FIG. 14 a sectional view of an additional schematically represented ejector, FIG. 15 a sectional view of an additional schematically represented ejector, FIG. 16 a schematically represented coupling part of the coupling mechanism of the ejector according to FIG. 15, FIG. 17 a sectional view through an additional coupling part, FIG. 18 a sectional view through an additional coupling part, and FIG. 19 a sectional view of a further additional coupling part.

FIG. 9 shows an ejector in which the stiffening elements 132 are embedded in the membrane 130 so that the thread 140, the cord, the wire, the cable or the like abuts directly on the outer shell 134 of the membrane 130.

With regard to the guide of the stiffening elements 132, it may also be sensible to provide guides 162 in the ejector body 144, which enable only radial evasion of the stiffening elements 132. The stiffening elements 132 can, for example, completely surround the outer shell 134 of the membrane 130. For example, these can be formed from an elastomer. The guides 162 are arranged in a manner radially spaced from the membrane 130 so that the movement of the membrane 130 for adjusting the desired flow cross-section 602 is not obstructed.

Figure 11:
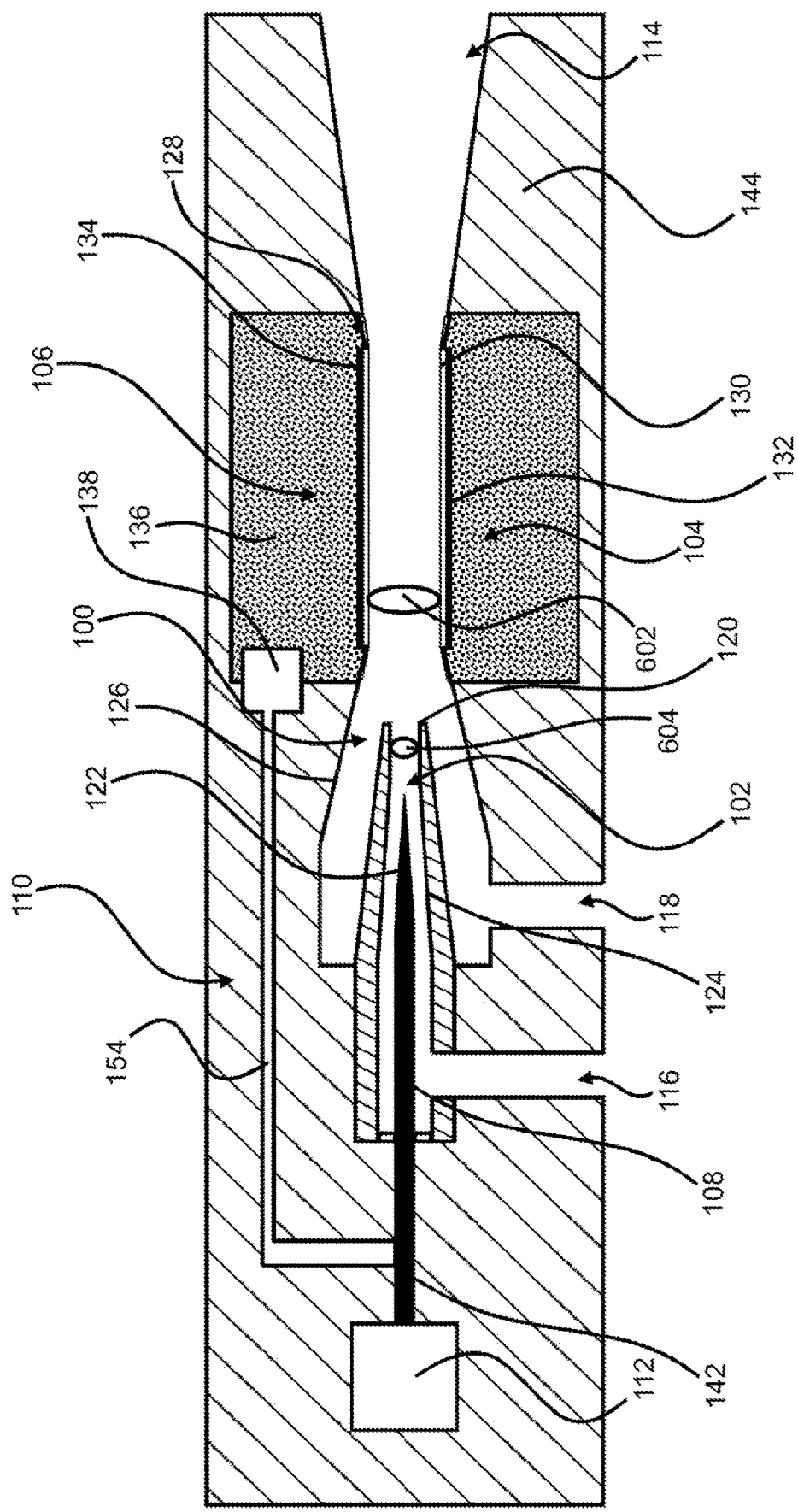
Figure 12:
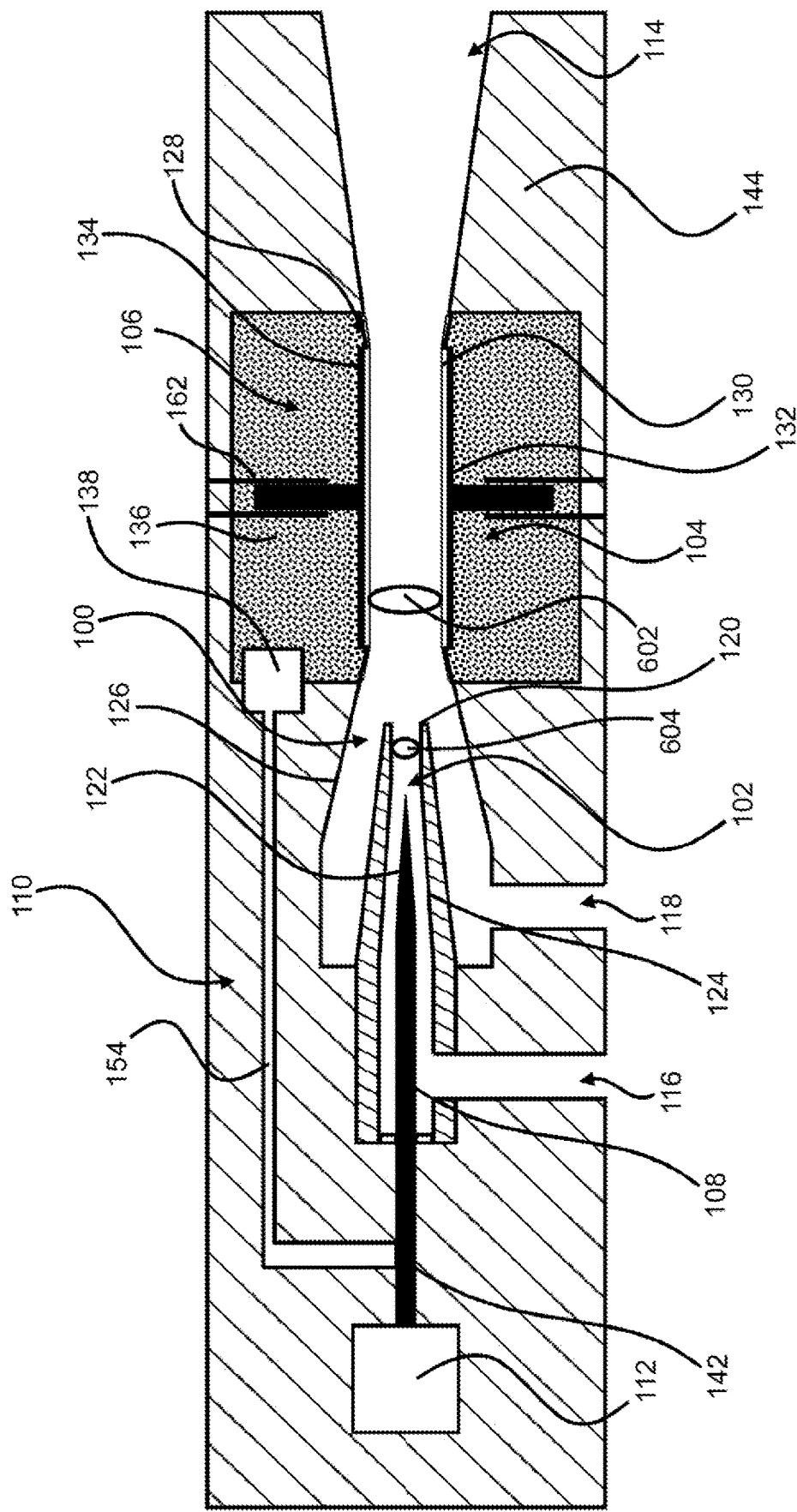

FIG. 11 shows an ejector in which the adjustment device 106 comprises a pressure chamber 136 that is designed to move the membrane 130 between the first and second positions if a piston 138 assigned to the coupling mechanism 110 is at least partially pushed into or withdrawn from the pressure chamber 136. The piston 138 is fixed to a rod assembly 154, which in turn is coupled to the needle 108. If the needle 108 is moved in the direction of the nozzle opening 120, the piston 138 enters the pressure chamber 136, whereby the membrane 130 performs an evasive movement and the flow cross-section 602 is thus reduced. The flow cross-section 602 is increased again if the piston 138 is pulled out of the pressure chamber 136 due to a retraction of the needle 108. With the variant of an ejector with pressure chamber 136 shown in FIG. 12, a guide 162 is again provided as already explained in connection with the ejector from FIG. 8.

Figure 13:
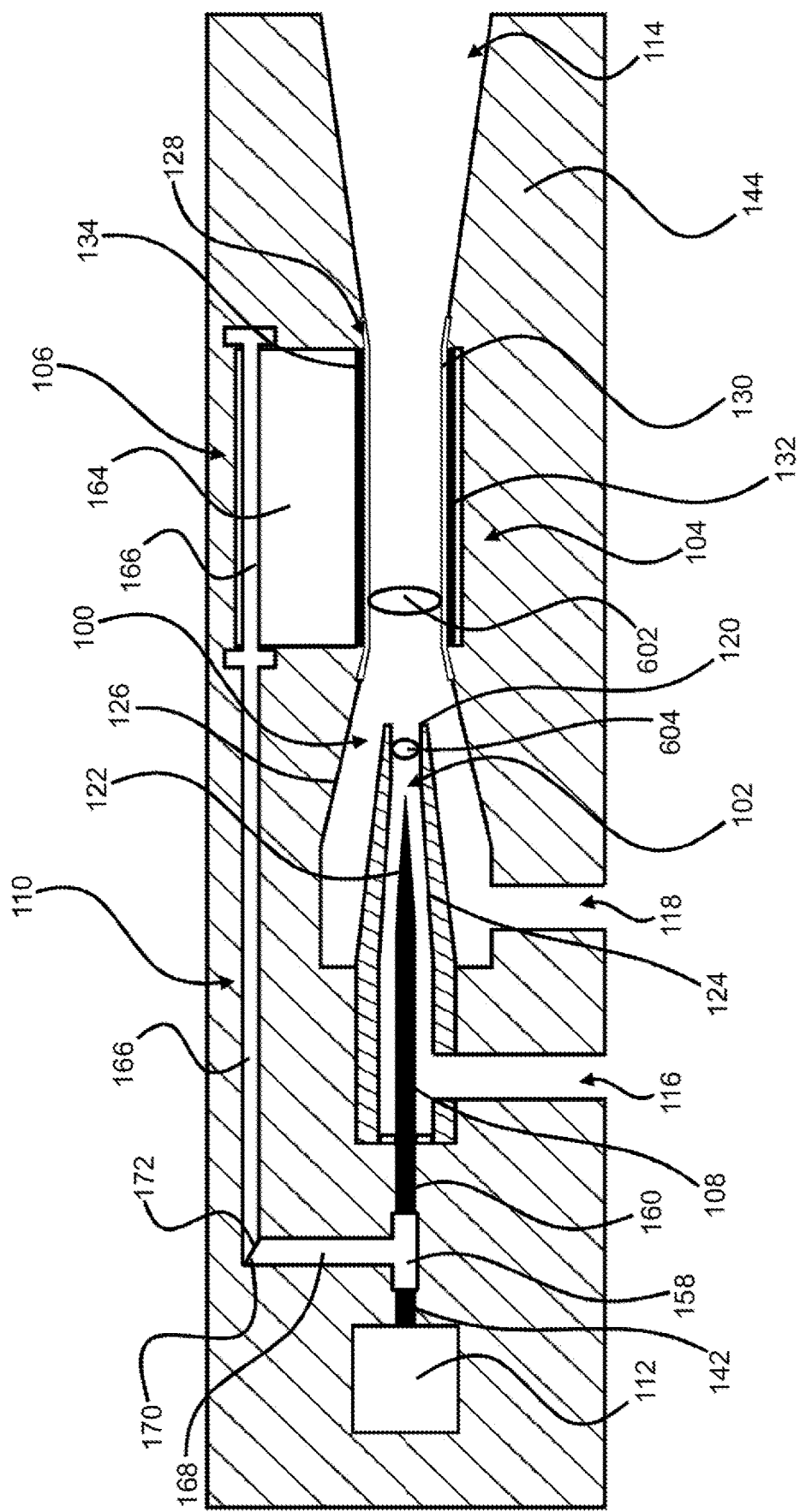

In the ejector according to FIG. 13, a belt 164, which is attached to a shaft 166, is wound around the membrane 130. If this shaft 166 is rotated, the belt 164 is wound up, reducing the flow cross-section 602 of the mixing tube 104. In this case, the shaft 166 is both part of the coupling mechanism 110 and part of the adjustment device 106. The needle 108 is formed with a gear rack 160 that meshes along a gear wheel 158, as a result of which an intermediate shaft 168 is rotationally driven around its longitudinal axis. The intermediate shaft 168 is thus rotatably mounted in a stationary manner opposite the ejector body 144. The intermediate shaft 186 has a second toothing 170, which forms a coupling with a spur gear 172 of the shaft 166. If the needle 108 is moved axially, the gear wheel 158 is rotationally driven due to the movement of the gear rack 106, whereby the toothing 170 also drives the spur gear 172 of the shaft 166. This winds up or unwinds the belt 164. For a particularly reliable movement, it has proven to be sensible if the width of the belt 164 corresponds to the width of the mixing tube 104 itself or the width of the membrane 130.

Figure 14:
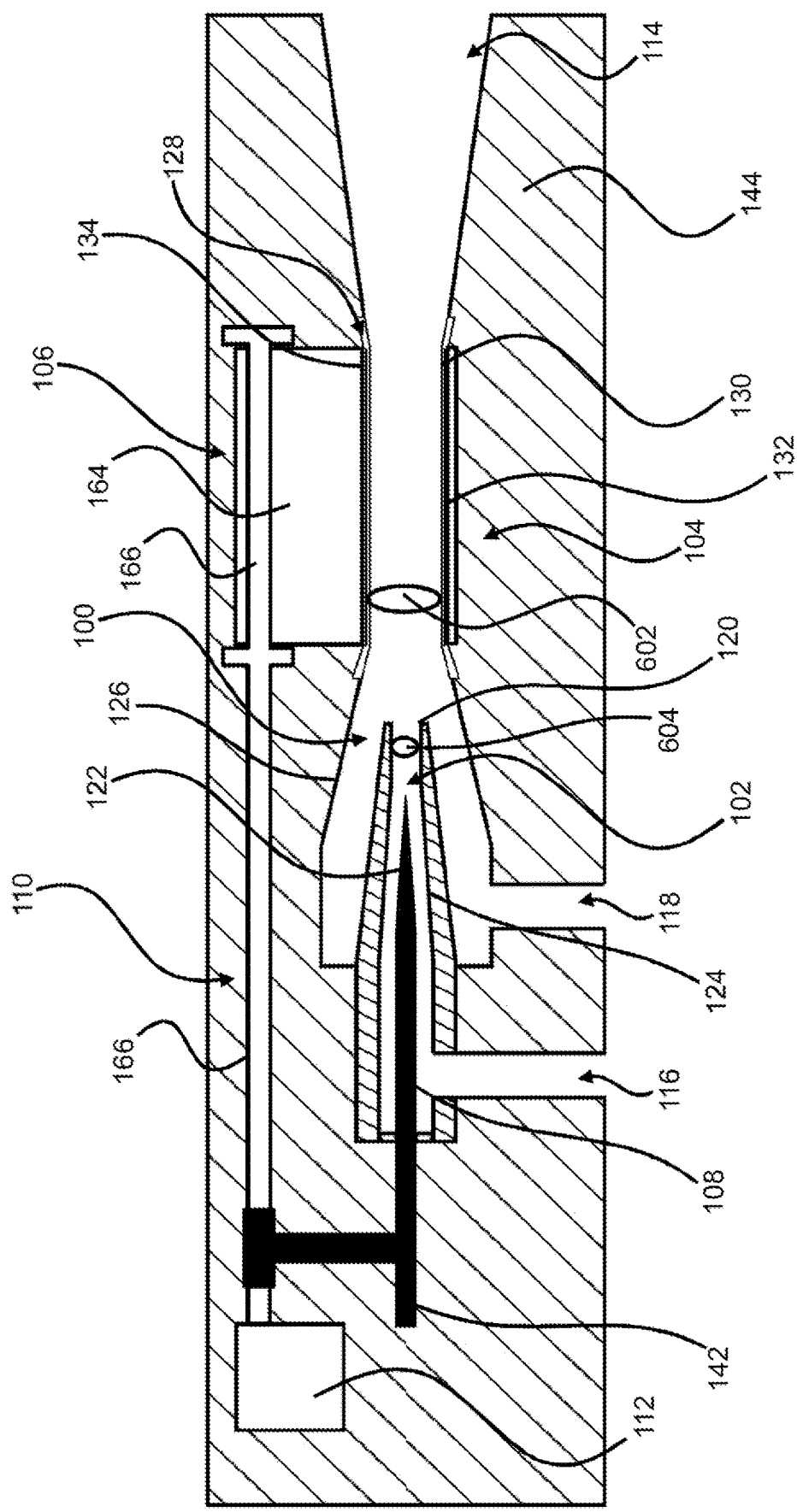

In the ejector according to FIG. 14, the actuator 112 is not designed as a linear drive but as a rotating drive that rotates the shaft 166. In this case, the shaft 166 has a threaded section or a gear rack that interacts with a counter-toothing. The counter-toothing is coupled to the needle 108 so that when the shaft 166 is rotated by means of the actuator 112, the result is an axial movement of the needle 108 on the one hand, and a winding-up or unwinding of the belt 164 takes place on the other hand.

Figure 15:
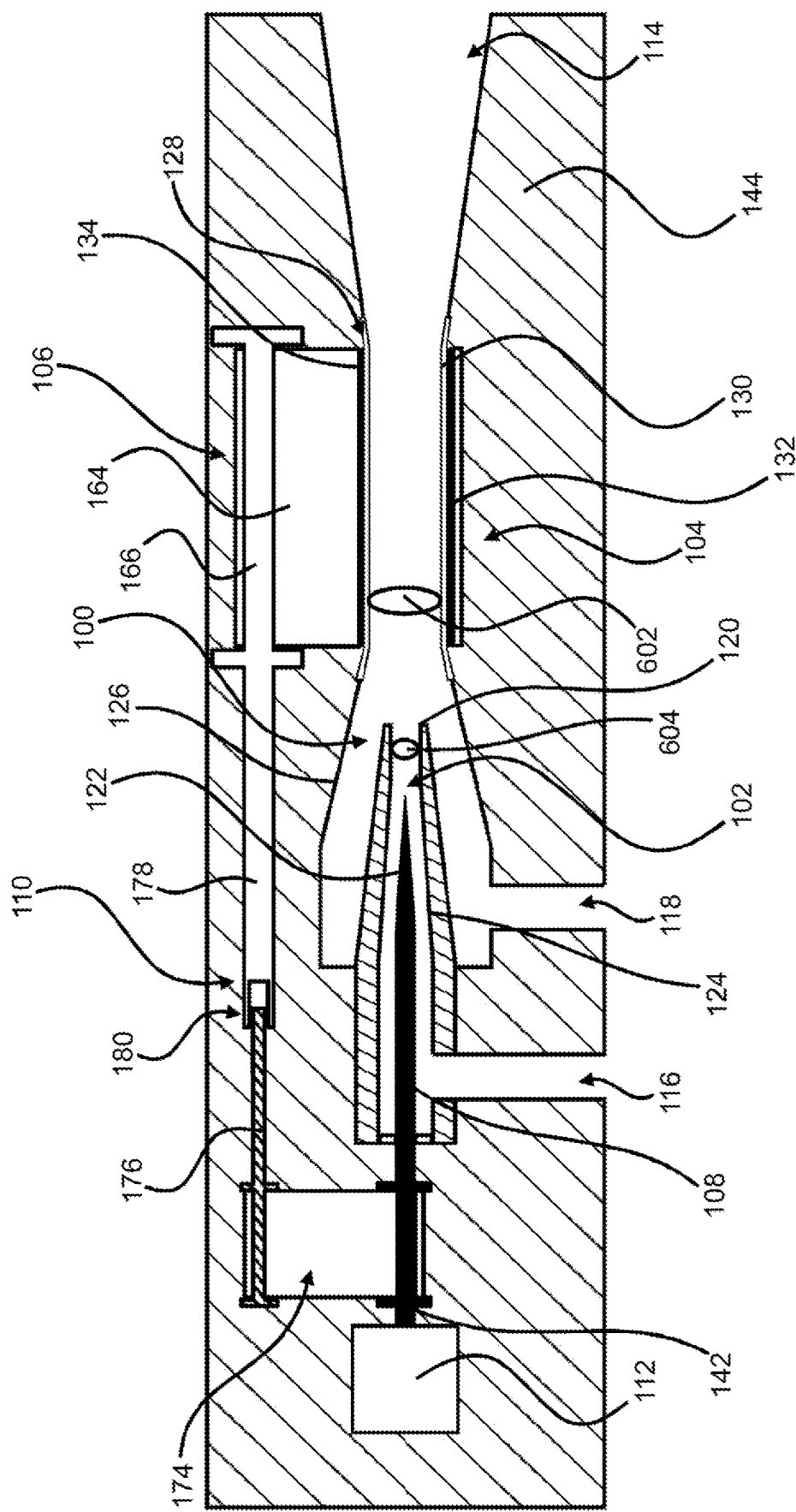
Figure 16:
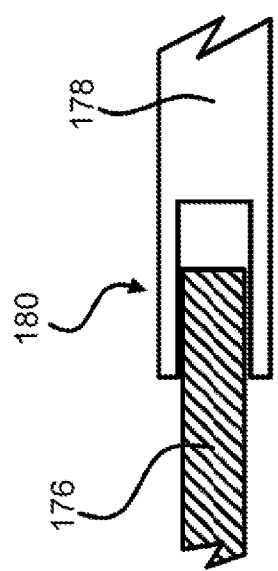

FIG. 15 shows an ejector in which the actuator 112 moves the needle axially and at the same time rotates it. This rotation can be transferred by means of a belt drive 174 to a first shaft part 176, which is connected in a rotationally fixed manner via a coupling 180 to a second shaft part 178, thus to the shaft 166 interacting with the belt 164. Although the coupling 180 is designed to be rotationally fixed, it enables an axial movement of the first shaft part 176 in relation to the second shaft part 178. This can be seen, for example, in FIG. 16, since the coupling 180 (for example, the second shaft part 178) has an area which the first shaft part 176 can enter in a manner axially movable but rotationally fixed.

Figure 17:
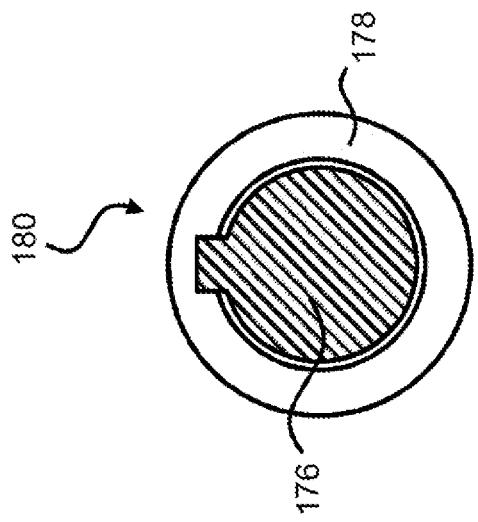
Figure 19:
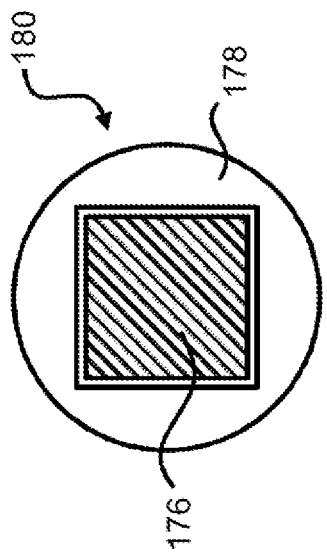
Figure 18:
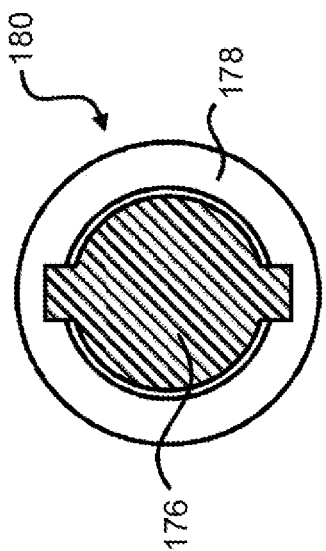

FIGS. 17, 18 and 19 show various sections showing a rotationally fixed but axially movable coupling of the first shaft part 176 and the second shaft part 178. In FIG. 17, the first shaft part 176 has a spring that engages in a fit of the second shaft part 178. FIG. 18, two spring parts are provided on the first shaft part 176. In FIG. 19, the second shaft part 176 has a rectangular, in particular square, cross-section, which is guided in a complementary section of the second shaft part 178.

The ejectors described above are characterized by their flexible adaptability to different operating conditions of a fuel cell system. This can be achieved in particular on the basis of the coupled movement of the needle 108 and the associated adjustment of the flow cross-section 602 of the mixing tube 104.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. An ejector, comprising:
 a suction nozzle;
 a drive nozzle;
 a mixing tube including an adjustment device for the at least region-wise adjustment of a flow cross-section of the mixing tube;

an axially movable needle inside the drive nozzle that is designed to adjust a flow cross-section of the drive nozzle; and a coupling mechanism that connects the adjustment device to the needle or to an actuator actuating the needle such that the adjustment device adjusts or alters the flow cross-section of the mixing tube as a function of axial movement of the needle.

2. The ejector according to claim 1, wherein an inner wall of the mixing tube includes an elastic membrane that can be moved between a first position forming a reduced flow cross-section of the mixing tube and a second position forming an enlarged flow cross-section of the mixing tube.

3. The ejector according to claim 2, wherein a restoring force acts when the membrane is in the first position or when the membrane is moved from the second position into the first position.

4. The ejector according to claim 2, further comprising a dimensionally stable stiffening element coupled to or embedded within the membrane.

5. The ejector according to claim 2, wherein the adjustment device includes an annular or helical or belt-shaped element that at least indirectly abuts an outer shell of the membrane, that is configured to move the membrane between the first position and the second position, and that is connected by the coupling mechanism such that movement of the membrane takes place as a function of the axial movement of the needle within the drive nozzle.

6. The ejector according to claim 2, wherein the adjustment device includes a pressure chamber designed to move the membrane between the first and the second positions when a piston coupled to the coupling mechanism is at least partially pushed into or withdrawn from the pressure chamber.

7. The ejector according to claim 2, wherein the coupling mechanism includes a traction element or an actuating rod.

8. The ejector according to claim 2, wherein the coupling mechanism includes a shaft that is connected to the adjustment device in a rotationally fixed manner and that is designed to be rotationally driven by the axial movement of the needle.

9. The ejector according to claim 2, wherein the coupling mechanism includes a transmission gear adapted to transfer the axial movement of the needle with a predetermined gear ratio to the movement of the membrane.

10. A fuel cell system having a fuel cell stack which is integrated into an anode circuit, into which an ejector is fluidically coupled, the injector comprising:

a suction nozzle;

a drive nozzle;

a mixing tube including an adjustment device for the at least region-wise adjustment of a flow cross-section of the mixing tube;

an axially movable needle inside the drive nozzle that is designed to adjust a flow cross-section of the drive nozzle; and a coupling mechanism that connects the adjustment device to the needle or to an actuator actuating the needle such that the adjustment device adjusts or alters the flow cross-section of the mixing tube as a function of axial movement of the needle.

* * * * *